United States Patent [19]

Patel et al.

[11] Patent Number: 4,467,050
[45] Date of Patent: Aug. 21, 1984

[54] FUEL CELL CATALYST MEMBER AND METHOD OF MAKING SAME

[75] Inventors: Pinakin Patel, Danbury, Conn.; Dilip Dharia, Edison, N.J.; Hansraj Maru, Brookfield Center, Conn.

[73] Assignee: Energy Research Corporation, Danbury, Conn.

[21] Appl. No.: 396,399

[22] Filed: Jul. 8, 1982

[51] Int. Cl.$^3$ .............. B01J 21/04; B01J 23/02; B01J 23/78; B01J 35/02
[52] U.S. Cl. .............................. 502/330; 502/101; 502/527
[58] Field of Search .............. 252/425.3, 477 R; 427/115; 429/40, 44; 502/101, 330, 527

[56] References Cited

U.S. PATENT DOCUMENTS

| | | | |
|---|---|---|---|
| 3,186,957 | 6/1965 | Stiles | 252/466 |
| 3,219,730 | 11/1965 | Bliton et al. | 427/115 |
| 3,488,226 | 1/1970 | Baker et al. | 136/86 |
| 3,498,927 | 3/1970 | Stiles | 252/451 |
| 3,513,109 | 5/1970 | Stiles | 252/462 |
| 3,627,790 | 12/1971 | Stiles | 260/369 |
| 3,645,915 | 2/1972 | Stiles | 252/462 |
| 4,019,969 | 4/1977 | Golebiowski et al. | 204/26 |
| 4,024,075 | 5/1977 | Russ et al. | 252/466 |
| 4,182,795 | 1/1980 | Baker et al. | 429/13 |
| 4,288,346 | 9/1981 | Hunter et al. | 252/477 R |
| 4,329,403 | 5/1982 | Baker | 429/35 |
| 4,363,753 | 12/1982 | Bozon et al. | 252/477 R |

*Primary Examiner*—W. J. Shine

[57] ABSTRACT

A fuel cell catalyst member formed from a metallic plate to whose surface is electrophoretically applied a porous support layer of ceramic material into which is impregnated an active catalyst material.

50 Claims, 4 Drawing Figures

FUEL CELL CATALYST MEMBER AND METHOD OF MAKING SAME

BACKGROUND OF THE INVENTION

This invention relates to fuel cell construction and, in particular, to a method of preparing a catalyst plate for use in, in situ, reforming of process fuels such as hydrocarbons and alcohols.

It has been recognized that in fuel cell operation, particularly, high temperature fuel cell operation such as found in molten carbonate and solid oxide cells, the heat generated can be used to reform the hydrocarbon content of the fuel cell process gas. The hydrocarbon content of fuel cell process gas frequently contains methane and other hydrocarbons such as, for example, propane, methanol, ethanol and other reformable organic fuels, and as used herein is also intended to include alcohols. The heat value on a mole basis, and, hence, electrical energy producing potential of methane is about three to four times greater than that of hydrogen. Since methane itself is relatively electrochemically inactive, it is very desirable to reform methane to form hydrogen and carbon monoxide in accordance with the reaction: $CH_4 + H_2O \rightarrow 3H_2 + CO$. The hydrogen and carbon monoxide can then participate in the fuel cell reaction either directly or by a further water-gas shift. An incentive for carrying out such reforming reaction in a fuel cell is that the reaction is endothermic and would serve to offset heat generated in fuel cell operation due to inherent irreversibility.

U.S. Pat. No. 3,488,226 discloses a fuel cell construction wherein reforming of process gas hydrocarbons is carried out in situ by placement of a suitable catalyst in direct heat exchange relationship to the cell. In this construction, the catalyst is in the form of nickel alumina-aluminum pellets of approximately one-half inch in diameter. These pellets are produced by crushing a nickel aluminum alloy and treating the resulting particles with a sodium hydroxide solution. The resultant mixture is maintained at its boiling point and allowed to undergo conversion of the aluminum to sodium aluminate and alumina. After the desired conversion, the reaction is quenched with water. Subsequent washings with water are followed by washings with methanol and the resultant pellets, thereafter, are stored in methanol.

U.S. Pat. No. 4,182,795, assigned to the same assigned hereof, discloses an improved construction wherein in situ hydrocarbon reforming is via a catalyst placed in an electrolyte-isolated passage, this passage being in heat transfer relationship with the cell. Such placement of the catalyst prevents electrolyte condensation which would normally occur in an electrolyte-communicative passage at cold spots created by the endothermic reforming reaction. The process gas in the electrolyte-isolated passage also acts as a cooling means so that cooling of the cell and reforming are simultaneously brought about by the single passage.

Disposition of the catalyst in the '795 patent construction is in layered or packed form on a plate defining the electrolyte-isolated passage. The configuration of the catalyst coated plate is U-shaped or corrugated with the catalyst being placed on the upper plate walls.

Finally, the '795 patent also mentions that a suitable catalyst for reforming methane hydrocarbon content is nickel or nickel based and that a commercially available version of such catalyst is Girdler G-56 which is provided in pellet form for packing in fixed bed type reactors.

Other practices, not specifically directed to in situ reforming in a fuel cell, but directed to forming catalyst members for hydrocarbon reforming in other applications are also known. U.S. Pat. No. 4,019,969 teaches a method for manufacturing catalytic tubes in which a metallic sponge is formed on the inner wall of a metallic tube by electrolysis. The sponge is then impregnated with appropriate salts of catalytic and ceramic substances and the assembly then roasted to provide the desired catalytic member.

U.S. Pat. No. 3,186,957 teaches a technique for forming pellet catalysts in which a slurry of alpha alumina hydrate and a soluble nickel salt are coprecipitated and, thereafter, the product calcinated at a low temperature to produce nickel oxide supported on a ceramic oxide (alumina). The coprecipitate is then formed into suitable pellet shapes and heated at a high temperature to establish a nickel aluminate interface between the nickel oxide and the ceramic oxide.

In U.S. Pat. No. 3,498,927 the starting material is a refractory oxide material which is gelled and to which is added, before or after gelling, a catalytic metal. The gel of the catalytic metal supported on the refractory material is then applied to a ceramic support structure, either by spraying or immersing. The product is then dried and calcinated to form the resultant catalyst.

U.S. Pat. No. 3,645,915 discloses a technique in which a catalyst comprised of nickel oxide, nickel chromite and a stabilizer are placed in a slurry form and the slurry applied to a refractory oxide or metallic support by impregnation or cementing. The resultant product is then calcined. When the support is metallic, the support may be roughened to provide an anchor for the applied materials.

U.S. Pat. No. 3,513,109 discloses use of a slurry of catalytic material and metal ammines and application of same to a refractory support. The slurry also may be provided with a refractory interspersant prior to applying the slurry to support. Such application may be by spraying or dipping and is followed by drying and subsequent calcination.

U.S. Pat. No. 3,627,790 teaches formation of a Raney nickel ($Ni-Al_3$) type catalyst by partially leaching aluminum from a nickel-aluminum alloy. This type catalyst is to be used for hydrogeneration at the fuel cell anode and not for reforming. A further U.S. Pat. No. 4,024,075, discloses a cobalt based catalyst for low temperature operation without significant carbon deposition.

While the above patents and practices for making catalysts have proved useful in the formation of certain forms of catalyst members, i.e., pellets, honeycombs, tubular structures, further practices are still being investigated as regards formation of such members to meet the stringent requirements of in situ fuel cell reforming. In such reforming the following conditions must be satisfied: (a) the catalyst must adhere to a metallic plate having an extended continuous surface; (b) the catalyst must be able to provide satisfactory reforming rates in the range of 1000° F. to 1300° F. and 1-10 atm operating pressure; (c) the catalyst must be stable in the presence of fuel cell electrolyte and at cell operating temperatures; (d) the catalyst should permit operation at low steam-to-carbon (s/c) ratios; (e) the catalyst should provide long term operation before regeneration is required, since regeneration may affect cell anode stability; (f) the catalyst should provide low ohmic resistance; (g) the catalyst should have crushing strength sufficient to withstand cell sealing pressures; and (h) the catalyst should enable reasonable heat exchange.

It is a primary object of the present invention to provide an improved fuel cell catalyst member and practice for in situ reforming of process fuels.

It is a further object of the present invention to provide a practice for realizing a fuel cell catalyst member meeting the above-mentioned requirements.

It is a further object of the present invention to provide a catalyst member of the aforesaid type which is adaptable for use in molten carbonate and solid oxide fuel cells.

SUMMARY OF THE INVENTION

In accordance with the principles of the present invention, the above and other objectives are realized in a practice in which a metallic fuel cell plate having an extended continuous surface is provided on such continuous surface with an electrophoretically deposited porous support layer of ceramic or refractory material and an active catalyst material capable of endothermic reforming is impregnated into the support layer.

In accordance with the embodiment of the invention to be described hereinafter, the metallic plate is first surface treated to provide a desired flatness and surface area promotive of adherence of the ceramic support material. Support material is then directly deposited on the plate by electrophoretic deposition. Following such deposition, the catalyst material is impregnated into the fine pores of the support material, preferably, by dipping the plate into a solution of the catalyst material. The impregnated plate is then dried and the dried plate activated by subjecting the plate to hydrogen or other reducing gas such as cracked ammonia under controlled heating. If desired, the activated plate may then be further processed by a final surface treatment which removes any insulating layer on the plate contact areas.

BRIEF DESCRIPTION OF THE DRAWINGS

The above and other features and aspects of the present invention will become more apparent upon reading the following detailed description in conjunction with the accompanying drawings in which.

DETAILED DESCRIPTION

Figure 1:
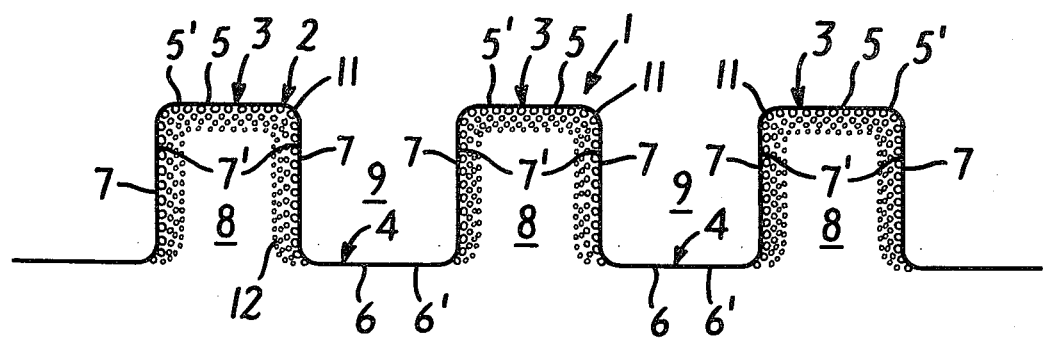
FIG. 1 illustrates a catalyst member in accordance with the principles of the present invention.

In FIG. 1, a fuel cell catalyst member 1 comprises a corrugated metallic plate or sheet 2 which, typically, might be stainless steel. The plate 2 includes crests regions 3 and valley regions 4 defined by extended continuous top plate sections 5, bottom plate sections 6 and side plate sections 7. The crests regions 3 define flow passages 8 for a first fuel process gas having a high hydrocarbon content such as, for example, methane, which is to be reformed to hydrogen as the process gas moves through these passages. The valley regions 4, in turn, define further flow passages 9 for a second fuel process gas including already reformed process gas and, therefore, of a higher hydrogen content than the first gas. This second gas is the fuel gas for the cell anode and undergoes electrochemical reaction in passage through the cell. The catalyst member is of the type used to provide the unipolar and bipolar plates (120, 124 and 130) of FIGS. 7-9 of the aforementioned U.S. Pat. No. 4,182,795.

In accordance with the invention, the catalyst member 1 is further provided on preselected surfaces of the regions 5, 6 and 7 with a porous catalyst support layer 11 of ceramic or refractory material. In particular, such support material is disposed on the surfaces of these regions defining the crest regions 3, i.e., on the lower surfaces 5' and the side surfaces 7' of the regions 5 and 7, respectively, and is directly applied by electrophoresis, as will be explained in greater detail hereinbelow. Preferable support materials are refractory or ceramic oxides such as oxides, aluminates, titanates and zirconates of suitable metals having a surface area in the range of 1 to 30 m$^2$/g. A more preferable material is lithium aluminate.

In further accord with the invention, the catalyst member 1 further comprises an active catalyst material 12 which is impregnated into the support layer 11 such that the active material is supported on the layer 11 ceramic particles. A preferable catalyst material is nickel, while other catalyst materials such as, for example, Ni-Co alloy or cobalt, might also be employed. Surface area of the catalyst material is preferably in the range of 0.1 to 10 m$^2$/g.

With the catalyst member 1 formed with the electrophoretically deposited support layer 11 and with the active catalyst 12 impregnated into the pores of such layer, a significant enhancement in active material retention and a corresponding benefit in reforming activity is realized. The overall structure thus provides effective reformation, while remaining stable in the fuel cell environment.

As can be appreciated, the catalyst member 1 can take on various configurations other than the configuration specifically illustrated. Common to these configurations will be the construction of plate and catalyst impregnated electrophoretically deposited support layer in catalyst member regions communicating with the gas to be reformed. Whether all such regions or just a number of such regions will be provided with a catalyst layer will depend upon the particular application and the degree of reforming reaction required. It is contemplated under the invention that such layer might also be applied to the surfaces of the regions 6 and 7 defining the valley regions 9, if the gas passing through such valley regions also has hydrocarbon content to be reformed. It is further contemplated that regions of the catalyst member serving to make electrical contact with other regions of the fuel cell, such as, for example, the bottom surfaces 6' of the regions 6, be free of the catalyst layer to promote good electrical contact.

Figure 2:
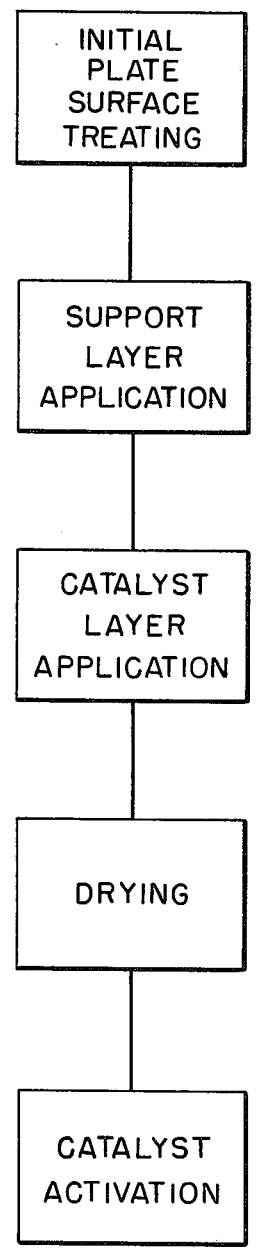
FIG. 2 shows a flow diagram of a method for fabricating the catalyst member of FIG. 1.

FIG. 2 shows a flow diagram of a method for fabricating the catalyst member 1 in accordance with the principles of the present invention. Such fabrication, as a first step, contemplates initial processing or surface treating of the metallic plate 2 to ensure flatness and surface area sufficient to obtain adherence of the catalyst support layer 11. Flatness and surface area in the respective ranges of ±3 mils and 2 to 10 cm$^2$/cm$^2$ are usable with more desirable ranges being ±0.5 mils and 3 to 5 cm²/cm².

In preferred practice, the aforesaid initial processing includes an annealing step in which the metallic member is heated at a temperature in the range of from about 1800°–2100° F. in a hydrogen atmosphere for a period of about 2 to 4 hours. Annealing provides stress relief under static load and yields a resultant corrugated metallic plate of extreme flatness.

Following the annealing procedure the initial processing continues with sand blasting or chemical etching of the plate surface to increase surface area. At this point, the initial processing may be terminated and the support material deposited or the initial processing may be continued with a further stress relieving practice either through further annealing, as previously described, or through flattening at pressures in the range of 0.5 to 1.0 ton/sq. in. area.

After initial processing, application of the catalyst support layer 11 follows. In accordance with the invention, support material is applied by electrophoretic, deposition, a preferable support material being lithium aluminate. In the case of the latter support material, an emulsion of a suitable solvent such as, for example, isopropanol containing a dispersing agent such as a cationic surfactant is prepared with lithium aluminate being supplied in an amount of about 50 to 90 mg. of lithium aluminate per cc. of isopropanol. Electrophoretic deposition of the emulsion is performed at voltages in the range of 500–700 volts at a current density of 1–2 mA/cm² for 20–50 seconds. The resultant deposited layer under such conditions will exhibit an acceptable porosity of 60–90% porosity and a good bond strength and stability.

Subsequent to deposition of the support material, the active material is impregnated. Preferably, this process follows immediately after (i.e., within about one to two minutes of) the deposition of the support material to prevent flaking of the electrophoretically deposited layer. Active material is nickel or a nickel alloy of surface area in the range of 1–5 m²/g and a preferable material is nickel with Co as a promoter. Impregnation can be by any conventional impregnation technique so as to fill the fine pores of the suport material. A typical technique might be chemical deposition of a salt of active material by horizontal dipping or soaking of the plate in a solution containing the active material. Soaking efficiency preferably can be improved by first applying a vacuum over the plate and then contacting the active material solution. Where nickel is the active material, a solution of nickel salt can be used. Typical salts might be $Ni(NO_3)_2$, $NiSO_4$, $NiCO_3$, nickel formate or acetate or combinations thereof. To this solution might also be added a volatile base such as, for example, $(NH_4)_2 CO_3$ or $NH_4OH$.

The impregnated catalyst member is then subjected to drying. Preferably air drying is used and continues for a period of 2–4 hours. Drying is further preferably carried out to provide uniformity in the catalyst layer. Horizontal disposition of the structure during drying provides the desired uniformity.

After drying has been completed, the catalyst material is activated. This can be done either with the catalyst member in situ or prior to the fuel cell construction. In the latter case, the member is placed in a hydrogen atmosphere under controlled heating whose rate is dependent on the active material applied and its melting point. A usable quantity of hydrogen is about 0.5–1.0 cc/min-cm², heated at a rate of about 0.5°–2° C./min.

At this point, fabrication of the catalyst member 1 is complete with the exception of removal of applied layered material in plate areas where the layers are not desired. In particular, it is desirable to remove the layers from plate areas where a good and uniform electrical contact with other components of the cell is desired. Such removal can typically be carried out by scraping or some other equivalent material removal technique.

Figure 3:
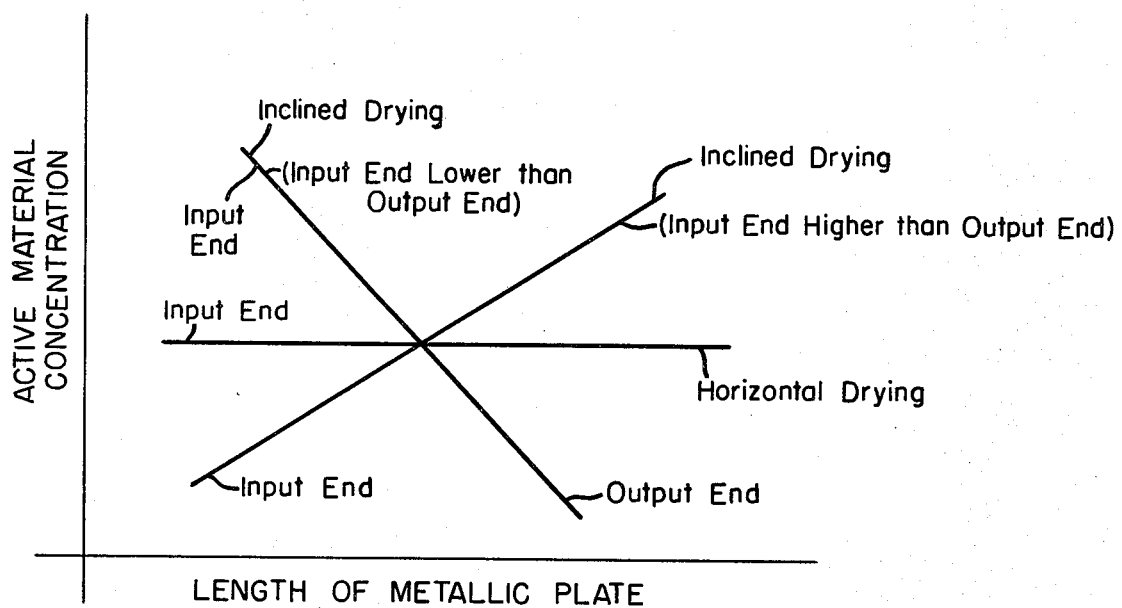
FIG. 3 illustrates total catalyst and support layer thickness along the length of the catalyst member for various angles of catalyst impregnation.

In the above-described procedure, drying of the impregnated catalyst was carried out with the plate 2 in horizontal orientation in order to obtain a uniform concentration and, therefore, uniform activity of the catalyst over the length of the plate. If other than a uniform concentration is desired then the plate can be inclined at various angles to the horizontal to obtain the desired non-uniformity. Thus, for example, if a larger concentration of the catalyst were desired at the input gas end of the plate relative to the output gas end, then the plate would be inclined during drying so as to situate the input end at a lower position than the output end (FIG. 3). If, on the other hand, a larger concentration were desired at the output end relative to the input end, the inclination of the plate would be reversed, i.e., the input end would be situated at a higher position than the output end. FIG. 3 pictorially shows catalyst concentration along the plate 2 length for the horizontal drying case and the above inclined drying cases.

With respect to impregnation of the catalyst layer, it also should be noted that promoters can be added to the catalyst layer in order to improve activity. Thus, materials such as, for example, Co, Cr, Mg, Mn, Ce and rare earth materials can be added. These materials may be in oxide form or elemental.

Using the above-described process, a number of catalyst members were constructed as illustrated by the following examples.

EXAMPLE I

In this example, a catalyst member with uniform catalyst concentration was obtained.

(A) Initial Plate Surface Treating:

A lightweight corrugated SS sheet metal plate (6.5"×6.5") was annealed at temperatures of 1850° F. in $H_2$ atmosphere for 3 hours. This stress relieving under static load yielded a very flat plate which is desirable for adherence of the support layer.

The annealed SS plate was then sand blasted to increase its surface area for enhancing the bond with the support material. The SS plate was then cold pressed (0.6 ton/sq. in. area) prior to the deposition of the support material.

(B) Support Layer Application:

Lithium aluminate support material was then electrophoretically deposited on the plate. The surface area of the lithium aluminate used was 17 m²/g as determined by the BET method. An intimate emulsion of lithium aluminate in isopropanol using 1 wt % of Doumeen TDO cationic surfactant was prepared. The emulsion had 78 mg of $LiAlO_2$ per cc of isopropanol. The electrophoretic deposition of the high surface area lithium aluminate on the sheet metal was performed at 530 volts and a current of 396 mA for 30 seconds. Using the above conditions, a deposited support layer having approximately 70% porosity was obtained. The total weight of lithium aluminate was 6.4 gm.

(C) Catalyst Layer Application

Nickel active material was then impregnated into the fine pores of the lithium aluminate support layer. This was done by dipping (horizontal soaking) in a concentrated (3.4M) solution of ($NiNO_3 \cdot 6H_2O$). Methanol also could have been used.

The dipping was carried out immediately after electrophoretic deposition to prevent flaking. With 3.4 M $NiNO_3 \cdot 6H_2O$ solution, a soaking time of 4 hours yielded approximately 24 gm. loading of the salt.

It is undesirable to use water as a solvent because it may attack the porous support layer. $NiSO_4$ may be used but the $H_2S$ produced during in situ activation can poison the nickel anode. However, it may be used for a specific case of internal reformer where the reforming is done in an isolated chamber.

(D) Drying:

Air drying of the impregnated catalyst plate structure for 3 hours was performed before its activation. Drying in the horizontal position yielded very uniform structure.

(E) Activation:

An internal reformer was built incorporating this catalyst member. The catalyst was activated in situ in an $H_2$ atmosphere under a controlled heating rate. 700 cc/min. of hydrogen and a heating rate of 1 C/min. were used. The heating rate influences the stability of catalyst structure (the flaking or sintering due to melting). The rate will vary depending upon the salt composition and its melting point.

Figure 4:
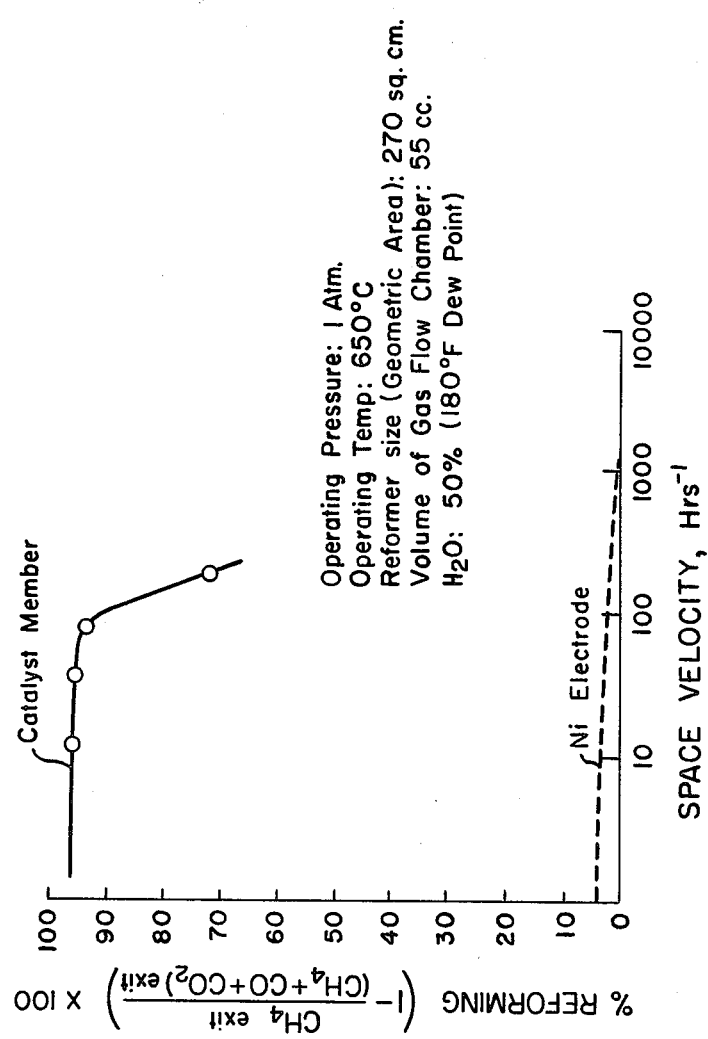
FIG. 4 shows a comparison curve for the reforming achieved with the present catalyst member as compared to a conventional member.

FIG. 4 shows the improved performance in fuel cell reforming realized with the fabricated catalyst member operated under molten carbonate fuel cell operating conditions. As can be seen from the solid line curve, 90 percent reforming of methane was realized when using the catalyst member of the invention, as compared to the less than 10 percent reforming realized when the member was not used.

EXAMPLE II

In this case, the steps of the preceding example were followed except that drying was carried out by inclining the plate so as to obtain impregnated catalyst of graded concentration and, therefore, graded activity.

It should be noted that, utilizing the practice of the present invention, the resultant support layer with impregnated catalyst can be of relatively thin dimension. Typically, layers as thin as 10 to 100 mils are realizable.

In all cases, it is understood that the above-described arrangements and practices are merely illustrative of the many possible specific embodiments which represent applications of the present invention. Numerous and varied other arrangements can readily be devised in accordance with the principles of the present invention without departing from the spirit and scope of the invention. Thus, for example, as an alternative to the material removal step, the application of support material and active material can be carried out selectively by screening or some other means so as to provide application only in the desired plate areas.

We claim:

1. A fuel cell catalyst member for use in a fuel cell which receives process gas containing hydrocarbon content, said member reforming said hydrocarbon content through communication between said process gas and said member, said member comprising:

a metallic plate having a continuous surface of extended dimension;

a porous support layer of ceramic material electrophoretically deposited on said surface, said ceramic material comprising lithium aluminate;

and an active catalyst material dispersed in said support layer.

2. A fuel cell catalyst member in accordance with claim 1 wherein:

said active material contains nickel;

and said metallic plate contains stainless steel.

3. A fuel cell catalyst member in accordance with claim 1 wherein:

said active catalyst material is uniformly dispersed in said support layer.

4. A fuel cell catalyst member in accordance with claim 1 wherein:

said active catalyst is non-uniformly dispersed in said support layer.

5. A fuel cell catalyst member in accordance with claim 1 wherein:

said support layer is on preselected portions of said surface.

6. A fuel cell catalyst member in accordance with claim 1 wherein:

said plate has opposing upper and lower surfaces which comprise said surface.

7. A fuel cell catalyst member in accordance with claim 6 wherein:

said support layer is on both said upper and lower surfaces.

8. A fuel cell catalyst member in accordance with claim 6 wherein:

said support layer is exclusively on one of said upper and lower surfaces.

9. A fuel cell catalyst member in accordance with claim 6 wherein:

said metallic plate is corrugated and includes crest regions and valley regions;

and said support material is on said lower surface in said crest regions.

10. A fuel cell catalyst member in accordance with claim 9 wherein:

said support material is excluded from said lower surface in said valley regions.

11. A method of producing a catalyst member for in situ reforming of the hydrocarbon content of process gas of a fuel cell comprising the steps of:

electrophoretically depositing a porous support layer of ceramic material to a continuous surface of extended dimension of a metallic plate;

and impregnating said support layer with an active catalyst material capable of reforming said hydrocarbon content of said fuel gas.

12. A method in accordance with claim 11 wherein said method further includes:

drying said impregnated plate.

13. A method in accordance with claim 12 further comprising:

activating said applied catalyst.

14. A method in accordance with claim 11 wherein:

the support material is an emulsion;

and electrophoresis is at a voltage in the range of 500–700 volts and at a current density of 1–2 $mA/cm^2$ for a period of about 20–50 seconds.

15. A method in accordance with claim 14 wherein:

said emulsion comprises lithium aluminate and a solvent.

16. A method in accordance with claim 15 wherein:

said solvent is isopropanol and the emulsion contains about 50 to 90 mg. of lithium aluminate per cc of isopropanol.

17. A method in accordance with claim 12 or 13 wherein:
said impregnation is by soaking in a solution containing the active material.

18. A method in accordance with claim 17 wherein:
soaking is carried out with the plate held horizontally to obtain uniform concentration of catalyst material in said support layer.

19. A method in accordance with claim 17 wherein:
said soaking is carried out with said plate inclined to the horizontal to obtain a non-uniform concentration of catalyst material in said support layer.

20. A method in accordance with claim 17 wherein:
said soaking is carried out by first applying a vacuum on the plate, and then contacting the solution containing active material.

21. A method in accordance with claim 17 wherein:
said active material comprises nickel.

22. A method in accordance with claim 21 wherein:
said solution is a nickel salt solution.

23. A method in accordance with claim 21 wherein:
said salt solution contains $Ni(NO_3)_2$.

24. A method in accordance with claim 21 wherein:
said salt solution contains $NiSO_4$.

25. A method in accordance with claim 21 wherein:
said salt solution contains nickel formate or nickel acetate.

26. A method in accordance with claim 11 further including:
prior to depositing said support layer, treating the surface of said plate to provide a desired flatness and surface area.

27. A method in accordance with claim 26 wherein:
said treating of said plate provides a plate surface area of from about 2 $cm^2/cm^2$ to 10 $cm^2/cm^2$.

28. A method in accordance with claim 27 wherein:
treating of said plate provides a plate flatness of $\pm 0.5$ to $\pm 3$ mils.

29. A method in accordance with claim 28 wherein:
treating said plate includes annealing said plate.

30. A method in accordance with claim 29 wherein:
annealing is carried out at a temperature of about 1800°–2100° F. in a hydrogen atmosphere for a period of about 2 to 4 hours.

31. A method in accordance with claim 29 wherein:
treating said plate further includes sand blasting said plate subsequent to said annealing operation.

32. A method in accordance with claim 31 wherein:
treating said plate further includes further annealing said plate subsequent to said sand blasting operation.

33. A method in accordance with claim 31 wherein:
treating said plate further includes flattening said plate at pressures in a range of 0.5 to 1–0 tons/sq. in. area subsequent to said sand blasting.

34. A method in accordance with claim 11 further comprising:
drying said impregnated plate, said drying being for a period of about 2 to 4 hours.

35. A method in accordance with claim 34 wherein:
drying is with air.

36. A method in accordance with claim 11 further comprising:
activating said catalyst material.

37. A method in accordance with claim 13 or 36 wherein:
activating comprises subjecting the plate to a hydrogen atmosphere under controlled heating.

38. A method in accordance with claim 37 wherein:
the quantity of hydrogen is about 0.5–1.0 cc/min-$cm^2$, heated at a rate of about 0.5°–2° C./min.

39. A method in accordance with claim 11 further comprising:
removing said support layer and said active catalyst from selected areas of said surface.

40. A method in accordance with claim 11 wherein:
said depositing of said support layer and application of said active catalyst material is to selected areas of said surface.

41. A method in accordance with claim 11 wherein:
said plate has first and second opposing surfaces which form said surface.

42. A method in accordance with claim 41 wherein:
said depositing is to said first and second surfaces.

43. A method in accordance with claim 42 wherein:
said depositing is exclusively to one of said first and second surfaces.

44. A method in accordance with claim 43 wherein:
said depositing is to preselected areas of said one surface.

45. A method in accordance with claim 11 wherein:
said porous support layer has a surface area in the range 1 to 30 $m^2/g$.

46. A method in accordance with claim 11 or 45 wherein:
said active catalyst material has a surface area in the range of 0.1 to 10 $m^2/g$.

47. A fuel cell catalyst member in accordance with claim 1 wherein:
said porous support layer has a surface area in the range of 1 to 30 $m^2/g$.

48. A fuel cell catalyst member in accordance with claim 1 or 47 wherein:
said active catalyst material has a surface area in the range of 0.1 to 10 $m^2/g$.

49. A fuel cell catalyst member in accordance with claim 1 wherein:
said hydrocarbon content includes one of methane, propane and alcohol.

50. A fuel cell catalyst member in accordance with claim 49 wherein:
said alcohol includes one of methanol and ethanol.

* * * * *